(No Model.)

L. A. SMITH & J. H. KRUSE.
FEED WATER PURIFIER.

No. 416,188. Patented Dec. 3, 1889.

Witnesses:
E. W. Stuart
F. H. Stuart

Inventors:
Lewis A. Smith,
J. Henry Kruse,
by C. P. Humphrey, atty.

UNITED STATES PATENT OFFICE.

LEWIS A. SMITH AND JOHN HENRY KRUSE, OF AKRON, OHIO.

FEED-WATER PURIFIER.

SPECIFICATION forming part of Letters Patent No. 416,188, dated December 3, 1889.

Application filed May 9, 1888. Serial No. 273,338. (No model.)

*To all whom it may concern:*

Be it known that we, LEWIS A. SMITH and JOHN HENRY KRUSE, citizens of the United States, residing at Akron, in the county of Summit and State of Ohio, have invented a certain new and useful Improvement in Feed-Water Purifiers, of which the following is a specification.

Our invention has relation to improvements in that class of purifiers in which the impurities, either held in suspension or chemically united with the water and rendered separable by heat, are deposited on surfaces within a closed chamber where the water is kept at a high temperature. These impurities are ordinarily deposited on metallic surfaces in the form of scale by causing the water to flow over such surfaces in a thin film, and this scale is very hard and difficult to remove, the efforts to remove it often resulting in damage to the metallic surfaces.

The objects of our invention are to prevent the deposit of the impurities directly on the metallic surfaces by covering them with a removable layer of other material, to which the impurities may attach, and increase the amount of the deposit and consequent purity of the water by the use of a material which shall afford increased surface to retain the impurities.

It consists of the devices illustrated in the accompanying drawings, as hereinafter described and claimed.

Figure 1:
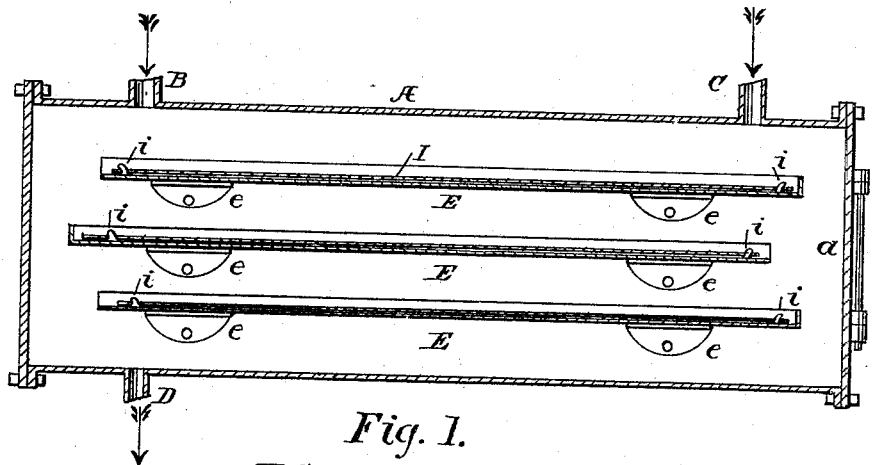
Figure 2:
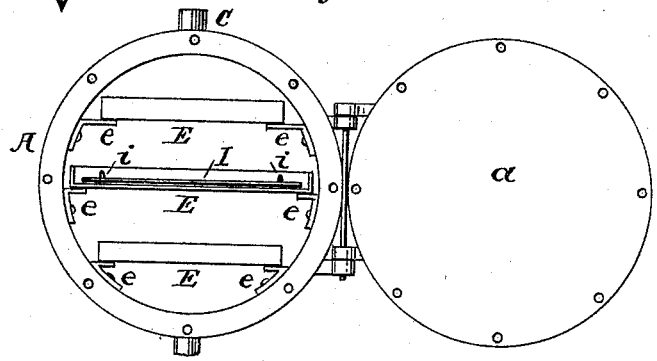
Figure 3:
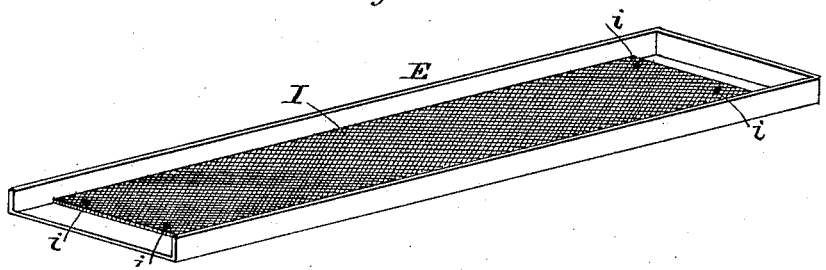

In the accompanying drawings, in which similar reference-letters indicate like parts, Figure 1 is a vertical central section of a purifier embodying our invention; Fig. 2, an elevation of the front end with the door open, and Fig. 3 a perspective of one of the troughs.

The vessel A is a hollow metallic cylinder with a pipe B for the introduction of steam, a pipe C for the entrance of water, and a pipe D where the purified water is drawn off, one end closed with a head secured by bolts and the other with a door *a*, suspended by hinges and held by bolts in the same manner as the head.

Supported within the cylinder A on brackets *e e* are shallow troughs E, each open at one end and closed at the other, and so arranged that the water entering through the pipe C shall enter the upper trough and pass successively through and over the succeeding troughs to the bottom of the cylinder A. In the bottom of each trough is placed a removable layer of some flexible fabric, as burlaps or felt, held in place by four small points *i i*, which project from the trough-bottom, and each inclined slightly toward its nearest corner.

In operation steam is introduced by the pipe B and water through the pipe C, whence it passes successively over the troughs to the bottom of the cylinder, whence it is drawn off through the pipe D. The water, heated by the steam, deposits its impurities on and through the fabric I, which, on account of its porous nature, affords greater surface for such deposit than the flat plates of the trough alone. When the fabric has become sufficiently coated, the door is opened, the troughs are drawn out, and the coated fabric stripped from each, (from which they readily separate,) and either cleaned or thrown away, when new fabrics are supplied and the troughs replaced.

Any fabric which is of open or porous texture may be used; but we prefer and recommend burlaps on account of its open texture and cheapness.

We do not confine our invention to any particular form of vessel or troughs, the essential feature being to pass the water in a thin film successively over the fabric in a heated chamber.

It will be obvious that this apparatus can be used for exhaust-steam by the addition of an escape-pipe for the steam.

We are aware that the form of vessel and troughs, and their arrangement as shown, is not of itself new, and such we do not claim; but

What we claim is—

1. The combination, in a feed-water purifier, of an inclosing-cylinder provided with steam and water pipes, a series of troughs located within said cylinder, through which the water successively flows, and a layer of flexible fabric removably attached to the surface of said troughs over which the water flows, substantially as shown, and for the purpose specified.

2. In a feed-water purifier of the kind designated, the combination, with the inclosing-cylinder having steam and water pipes, of the troughs located therein, through which the water successively passes in a thin film, the layers of flexible fabric placed in said troughs, and the points for retaining said fabric, all constructed and arranged substantially as shown, and for the purpose specified.

In testimony that we claim the above we hereunto set our hands.

LEWIS A. SMITH.
J. HENRY KRUSE.

In presence of—
C. P. HUMPHREY,
F. H. STUART.